United States Patent

[11] 3,576,321

[72] Inventor Heinrich Faste
 Bremen, Germany
[21] Appl. No. 778,248
[22] Filed Nov. 22, 1968
[45] Patented Apr. 27, 1971
[73] Assignee Friedrich Kocks

[54] METHODS AND APPARATUS FOR TREATMENT OF METAL HEATS
7 Claims, 2 Drawing Figs.

[52] U.S. Cl. ................................................ 266/36, 75/13, 75/61
[51] Int. Cl. ................................................ C21c 5/42
[50] Field of Search .................................... 266/34, 34 (A), 36 (R); 75/13, 46, 61, (Inquired), 93

[56] References Cited
UNITED STATES PATENTS

| | | | |
|---|---|---|---|
| 2,319,402 | 5/1943 | Heuer | 266/34 |
| 2,622,977 | 12/1952 | Kalling et al. | 75/61 |
| 2,866,703 | 12/1958 | Goss | 266/36 |
| 3,180,633 | 4/1965 | Taylor | 266/34 |
| 3,314,670 | 4/1967 | Kennedy | 266/34 |
| 3,393,997 | 7/1968 | Faste | 75/61 |
| 3,396,229 | 8/1968 | Sundberg | 266/34 |

Primary Examiner—Gerald A. Dost
Attorney—Buell, Blenko & Ziesenheim

ABSTRACT: A method and apparatus is provided for treatment of molten metal to provide higher reaction efficiency between slag and metal by the steps of moving a molten layer of metal in one direction by magnetic impulses and centrifugal motion, applying a layer of slag forming material on the metal layer and moving the same contrary to the direction of the molten metal while reacting the two and collecting the metal and slag at spaced apart points. The apparatus provides a drum rotatable on a horizontal or inclined axis, open at the ends and refractory lined, means for rotating the drum, means for charging the drum at opposite ends, a magnetic field intermediate the ends of the drum urging the metal to flow in one direction against gravity and collecting furnaces at the drum ends.

INVENTOR
Heinrich Faste

INVENTOR
Heinrich Faste

METHODS AND APPARATUS FOR TREATMENT OF METAL HEATS

This invention relates to methods and apparatus for treatment of metal heats and particularly to a method and apparatus for treating iron or steel heats, in a revolving drum, through which the molten metal to be treated by reacting materials flows and in which the metallurgical treatment is carried out.

It is well known that during the metallurgical treatment of molten metals, an exchange of materials takes place between the molten metal heat on the one hand, and for example, slag, which is floating thereon, on the other hand. Most metallurgical refining processes are in one way or another based upon such a reaction between molten metal and slag. In such processes, the treatment is such that the slag contains or consists entirely of a material which reacts with impurities in the molten metal and wherein the reaction products are absorbed again by slag. The reactions between slag and molten metal are, as is well known, substantially influenced by the concentration of reacting materials in the slag, the reaction being more intensive and effective, the higher the concentration of reaction materials in the slag. Recognizing this, it has been the practice in the past, to improve the effectiveness of the slag by adding new slag in several steps one after another to replace the old slag which is removed before adding the new slag. This does substantially improve the effectiveness of the slag and as a result significantly improves the resulting treated metal. This practice has the disadvantage of being expensive and in many cases the multiple slag treatment is simply too costly for efficient and economical operations. As a result, many metals which could be improved by multiple slag treatments are not treated because of the economics.

The present invention is directed to a method and apparatus which achieves the same result as multiple slag treatment but at a much reduced cost.

Preferably I provide a method which comprises moving a molten metal layer in one direction by magnetic impulses and centrifugal motion, applying a layer of slag-forming material on the metal layer and moving the same contrary to the direction of the molten metal while reacting the two and collecting the metal and slag at spaced apart points.

An apparatus according to my invention provides a drum rotatable on a horizontal or slightly inclined axis, open at the ends, and provided with a refractory lining and means for rotating said drum. Preferably the drum is provided with support rings on the outer circumference adjacent the two ends supported on rollers which rotate the drum. Preferably the ends of the drum extend into collecting furnaces which may be stationary or tiltable. Charging devices are provided at each end of the drum, at one end for charging the metal and at the other end for charging solid, liquid or gaseous reaction and slag-forming materials, so that the metal and the reaction materials pass through the drum in opposite directions.

The device according to the invention is characterized by a tapered widening of the nominal width of the lining extending over the center section of the drum only and with a smooth transition to the cylindrical ends of the drum. The invention, in addition, provides, at least in the conical section of the drum for current-carrying coils, whereby their electromagnetic fields act on the melt in the opposite direction to the slope. The provision of the conical section assures that a uniform flow of the drum contents is achieved from the end with the smaller diameter towards the larger drum diameter. The conical section needs to be tapered only slightly so that the holding time of the materials is just long enough to permit completion of the reactioning process.

The electromagnetic fields of the coils have the additional effect that the metallic melt flows in the opposite direction, that is, from the larger to the smaller drum diameter. With regard to the arrangement of the coils, several concepts are already known by which the desired flow effect can be achieved. It is possible, for example, to generate a moving field over the length of the conical drum section by using three-phase alternating current. A similar effect can be obtained by using single-phase alternating current.

The device, according to the invention, is of simple construction, operationally safe to a high degree and permits to achieve metallurgical reactions between metallic and nonmetallic materials by using the so-called counter-current principle, which has been tried many times in the past for metallurgical processes, but has never been accomplished in such perfect manner. By changing the field intensity, it is possible to adapt the through-flow time as required for a certain reaction time.

If the drum rotates at such a high speed that the metal contained in it will completely and constantly cover the entire circumference of the refractory lining on account of the centrifugal force, it will protect the refractory lining against damage which could be done by the aggressive intermediate products generated during the reactioning process.

This device according to the invention also permits, for example, the desulfurization of pig iron by using soda or lime, whereby a high degree of utilization of the reactioning material as well as high purity of the pig iron can be achieved. Due to the fact that the slag is highly saturated with sulfur prior to the exit from the conical drum section and that it gets in contact thereafter with iron of high sulfur content, such slag is used up until practically complete saturation. On the other hand, fresh slag still capable of a high desulfurization effect comes in contact with pig iron of low sulfur content in the small diameter section of the drum, with a resulting high degree of desulfurization of the pig iron and a high rate of efficiency in the use of the slag.

I have described certain objects, purposes and advantages of my invention in the foregoing general description. Other objects, purposes and advantages will be apparent from a consideration of the following description and the accompanying drawings in which.

Figure 1:
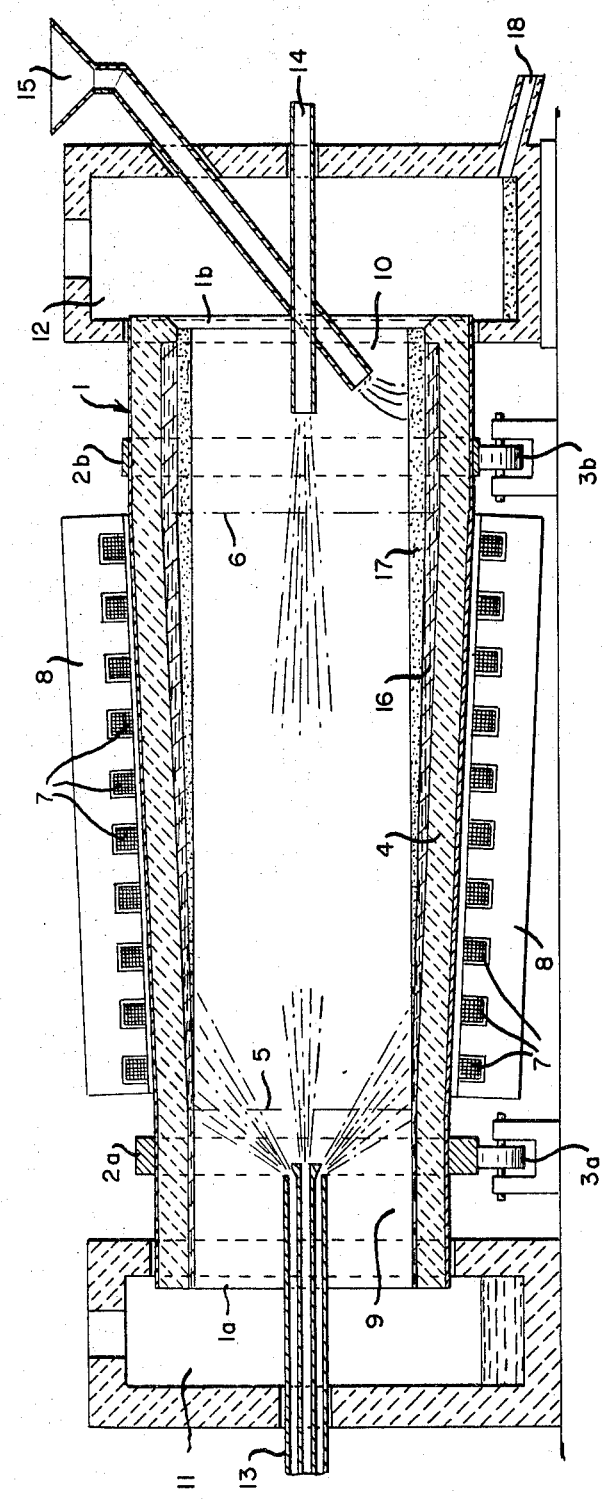
FIG. 1 is a longitudinal section of an apparatus according to my invention.
Figure 2:
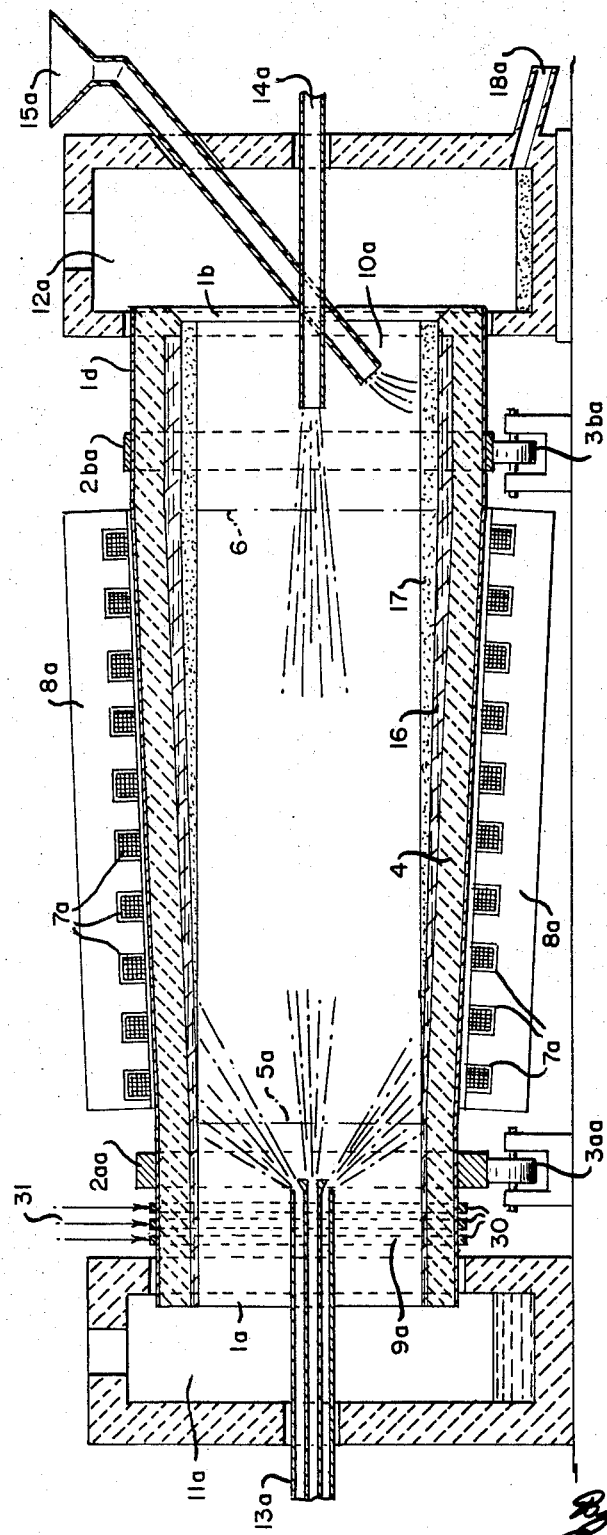
FIG. 2 is a longitudinal section of a second embodiment of my invention.

Referring to the drawing I have illustrated a horizontally arranged drum 1 open at its two ends 1a and 1b and provided with two circumferential supporting rings 2a and 2b adjacent the two ends of the drum. The horizontally arranged drum 1 with the two supporting rings 2a and 2b is held and rotated by several rollers of which only one roller per ring, namely 3a and 3b are shown on the drawing. On the inside the drum is lined with refractory material 4. The lining in the drum center section 5—6 is conical with a smooth transition to the cylindrical end sections 9 and 10. In the conical section 5—6 the drum has been provided with current-carrying coils 7 which, in this case, are embedded in a stationary nonrevolving pack of sheet metal plates 8 surrounding the drum 1. Similar coils 7a with the sheet metal pack 8a can also be fixed to the drum 1d and rotate with the same provided the electric current is transmitted through collectors 30 on the drum 1 d which contact current-carrying brushes 31.

The ends 1a and 1b of the drum 1 reach into the nonrevolving collecting furnaces 11 and 12 which may be stationary or tilting. The charging devices 13 and 15 run through the collecting furnaces 11 and 12 and into the drum 1.

In the example shown, the metallic melt 16 is supplied through charging pipe 15 into the rapidly revolving drum. The metallic melt covers the lining on the circumference and flows towards the small diameter section 5 of the drum and into the collecting furnace 11, influenced by the electromagnetic fields which are acting against the gravity and the centrifugal forces. The nonmetallic material 17 is supplied to the drum over the outside pipe of the charging device 13 and is moved through the drum by centrifugal force, thereby being in constant contact with the metallic melt. The nonmetallic material (slag) is collected in furnace 12 from which it is discharged through nozzle 18. The charging device 14 and the internal pipe of charging device 13 may be used also for introducing combustible gases and solids for heating the furnace.

While I have illustrated and described a present preferred practice and embodiment of my invention in the foregoing specification, it will be understood that the invention may be otherwise embodied within the scope of the following claims.

I claim:

1. A method of treating molten metal to provide higher reaction efficiency comprising the steps of moving a molten layer of metal in one direction by magnetic force and centrifugal motion, applying a layer of slag-forming reacting material on the metal layer and moving the same contrary to the direction of metal flow while reacting the metal and slag forming material and collecting the metal and slag materials at spaced-apart points.

2. The method as claimed in claim 1 wherein the metal is moved up an inclined surface contrary to gravity and the slag-forming materials move contrariwise by gravity.

3. An apparatus for treatment of molten metal to provide higher reaction efficiency between slag and metal comprising a drum rotatable about its axis, at least at part of the internal surface thereof being inclined from the horizontal, means for rotating said drum, means for charging molten metal to be treated into one end of the drum adjacent the bottom of the inclined surface, means for charging a reaction material into the other end of said drum, a magnetic field intermediate the ends of said drum urging molten metal in the drum to move up the inclined surface against gravity and collecting means at each end of the drum.

4. An apparatus as claimed in claim 3 wherein the drum is rotatable about a horizontal axis and is provided with a refractory lining having an intermediate inclined portion between two cylindrical end portions.

5. An apparatus as claimed in claim 3 wherein the magnetic field is stationary and surrounds the outside of the drum.

6. An apparatus as claimed in claim 3 wherein the magnetic field is fixed to the drum and rotates therewith.

7. An apparatus as claimed in claim 3 wherein the collecting means are furnaces at each end of the drum, receiving the drum ends and molten material therefrom.